United States Patent Office 3,471,454
Patented Oct. 7, 1969

3,471,454
β-PROPIONIC ACIDS, β-PROPIOLACTONES, AND POLYMERS THEREOF
Roe C. Blume, Wilmington, Del., assignor to E. I. du Pont de Nemours and Company, Wilmington, Del., a corporation of Delaware
No Drawing. Filed July 14, 1966, Ser. No. 565,106
Int. Cl. C08g 17/02
U.S. Cl. 260—78.3    12 Claims

ABSTRACT OF THE DISCLOSURE

High-melting, dyeable film-and/or fiber-forming polyester and copolyesters made up in whole or part of poly (α-hydroxymethyl-α-methyl-β-propiolactone) are prepared in a multi-step process. α-Chloromethyl-α-methyl-β-propiolactone is hydrolyzed to α-chloromethyl-α-hydroxymethylpropionic acid whose hydroxyl function is reacted with selected unsaturated ethers (e.g., methyl isopropenyl ether, 2,3-dihydropyran) to form acetals which "protect" the hydroxyl group. A "protected" β-lactone is then prepared and polymerized or copolymerized (e.g., with pivalolactone), after which the acetal group is removed by hydrolysis to return the hydroxymethyl group dyesite.

---

This invention relates to a novel lactone and to novel polymers prepared therefrom. More specifically, this invention relates to α-hydroxymethyl-α-methyl-β-propiolactone and to polyesters and copolyesters prepared therefrom. The invention further comprehends fibers and films, which exhibit highly desirable properties, prepared from these novel polymers.

The present invention provides α-chloromethyl-α-hydroxymethylpropionic acid. It further provides derivatives of α-hydroxymethyl-α-methyl-β-propiolactone in forms wherein the hydroxyl group is protected. This invention also provides useful polyesters and copolyesters which are made up in whole or part from poly(α-hydroxymethyl-α-methyl-β-propiolactone) units. These and other provisions will become apparent from the specification and claims which follow.

In accordance with the present invention, α-chloromethyl-α-methyl-β-propiolactone (I) is hydrolyzed to form α-chloromethyl-α-hydroxymethylpropionic acid (II), $CH_3C(CH_2Cl)(CH_2OH)COOH$. The acid (II) is then reacted with an unsaturated ether selected from the class represented by the structural formulas $R_1$—O—$C(R_2)$=$C(R_3)(R_4)$ and

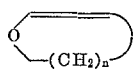

to form an acetal having the structure (IIIa) or (IIIb), respectively,

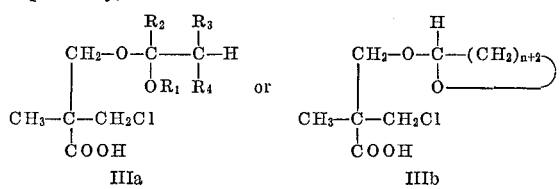

wherein $R_1$ represents a lower alkyl radical (by lower alkyl is intended from 1–4 carbon atoms alkyl), preferably a methyl radical; $R_2$ represents a hydrogen atom or a lower alkyl radical, preferably a methyl radical; $R_3$ and $R_4$, which may be the same or different, represent members of the class consisting of a hydrogen atom, a lower alkyl radical or a phenyl radical and are preferably each hydrogen atoms; $n$ is 1, 2, or 3. The acetals (IIIa) and (IIIb) are subsequently cyclized with caustic solution to yield β-lactones having the structures represented by (IVa) or (IVb), respectively.

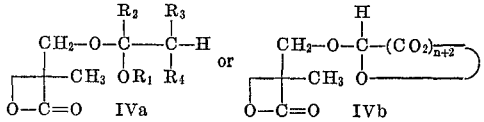

β-Lactones of the class represented by structures (IVa) and (IVb) are readily polymerized to polyesters consisting essentially of the following recurring respective structural units:

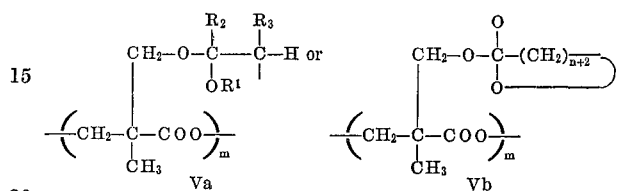

The latter can be easily converted by acid-catalyzed hydrolysis, even in shaped form, to polyesters consisting essentially of the following recurring structural unit:

(VI)   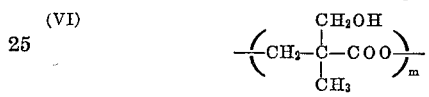

The polymer of Formula VI is designated as poly(α-hydroxymethyl-α-methyl-β-propiolactone). In each instance above, $m$ represents a number sufficiently large to provide a polymer having an inherent viscosity of at least 0.15 when measured as a 0.5% solution in trifluoroacetic acid at 30° C.

In addition, the present invention comprehends copolyesters of inherent viscosity of at least 0.3 as measured above and comprised of structural units represented by Formulas Va, Vb, and VI, each at least about 75% of recurring structural units of the formula (VII)   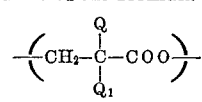

wherein Q and $Q_1$ are the same or different alkyl radicals containing from 1 to 4 carbon atoms which may optionally be joined by carbon-to-carbon bonds to form an alicyclic ring. Blends of polymers represented by structural Formula VII with the polymers of Formulas Va, Vb, and VI, respectively, are also comprehended by this invention. Typical α,α - dialkyl-β-propiolactones which provide polyester units of the structural formula represented by VII include pivalolactone; α,α - diethyl-β-propiolactone; α-ethyl-α-methyl-β-propiolactone; α,α-dipropyl-β-propiolactone; α,α-dibutyl-β-propiolactone; and α,α-pentamethylene-β-propiolactone. The preferred copolyester of this invention is comprised of about 10% of units corresponding to Formula VI and 90% of units corresponding to Formula VII wherein Q and Q' are methyl radicals.

While a large number of unsaturated ethers are suitable for use in this invention, examples of the preferred class are illustrated by methyl isopropenyl ether and 2,3-dihydropyran (hereinafter called "dihydropyran"). Other useful ethers include methyl vinyl ether, methyl β,β-dimethylvinyl ether, methyl β,β-diethylvinyl ether, methyl β-methyl-β-n-propylvinyl ether, methyl β-n-butyl-β-ethylvinyl ether, methyl β-methyl-β-phenylvinyl ether, methyl 1-propenyl ether, ethyl 1-propenyl ether, ethyl 1-butenyl ether, ethyl β-methyl-β-n-propylvinyl ether, 2,3-dihydrofuran, and the like.

The preferred β-lactones of this invention represented by structural Formulas IVa and IVb, supra, are α-

(1 - methoxy-1-methylethoxy)methyl-α-methyl-β-propiolactone and α-methyl-α-(2-tetrahydropyranyloxy)methyl-β-propiolactone. Other β-lactones prepared by the process of this invention include α-(1-methoxyethoxy)methyl-α-methyl-β-propiolactone, α-(1-methoxypropoxy)methyl-α-methyl-β-propiolactone, α-(1-methoxy-2-methylpropoxy) methyl-α-methyl-β-propiolactone, α-(1 - methoxy-2-ethylbutoxy)methyl-α-methyl-β-propiolactone, α-(1 - methoxy-2 - methylpentoxy)methyl-α-methyl-β-propiolactone, α-(1-methoxy - 2 - ethylhexoxy)methyl-α-methyl-β-propiolactone, α-(1-methoxy-2-phenylpropoxy)methyl-α-methyl-β-propiolactone, α-(1-ethoxypropoxy)methyl - α - methyl-β-propiolactone, α-(1-ethoxy - 2 - methylpropoxy)methyl-α-methyl-β-propiolactone, α-(1 - ethoxybutoxy)methyl-α-methyl-β-propiolactone, and the like.

The polyesters V$a$ and V$b$ of this invention are prepared by adding to the lactones IV$a$ and IV$b$ a trace of a polymerization initiator such as tetrabutylammonium hydroxide, tetrabutylammonium bromide, or di-(tetrabutylammonium)adipate. The polymerization may be carried out in an inert liquid diluent, for example, n-hexane or ethyl acetate, preferably at reflux.

The novel polyesters and copolyesters of this invention can be melt-spun into fibers which can be drawn and heat set and which possesses desirable thermal and dyeability properties. The fact that the preferred poly(α-hydroxylmethyl-α-methyl-β-propiolactone) of this invention exhibits a polymer melt temperature of about 190° C. is quite unexpected. For example, polymers prepared from unsymmetrical α,α-disubstituted-β-propiolactones wherein the carbon atom adjacent to the carbonyl group is substituted with one methyl group and with one group other than methyl are shown by Thiebaut et al. in "Industrie des Plastiques Modernes," 14, 16 (1962) March, to be too low melting to form useful fibers. In this reference poly[α-methyl-α-(n-propyl)-β-propiolactone] and poly[α-methyl-α-(n-pentyl)-β-propiolactone] are shown to melt at 80° C. and 54° C., respectively, while poly[α-(n-butyl)-α-methyl-β-propiolactone] as a liquid at room temperature.

Copolymers prepared according to the process of this invention melt as high as 220° C., as will be subsequently shown. In addition to being thermally stable, yarns and fabrics prepared from the hydroxyl-containing polyesters and copolyesters of this invention are readily dyed (at high dye bath exhaust) with, for example, the reactive dyes identified by Colour Index Codes C.I. Reactive Red 10, C.I. Reactive Yellow 5, C.I. Reactive Orange 3, and C.I. Reactive Blue 6 to strong shades which remain fast after repeated washing and dry-cleaning treatments. However, the reactive dyes previously cited herein were found to be highly fugitive when applied to a control yarn of poly(α,α-dimethyl-β-propiolactone). In addition, fibers, yarns, and fabrics prepared from the copolyesters of this invention whose structures comprise repeating units of poly(α - hydroxymethyl-α-methyl-β-propiolactone) copolymerized with Formula VII polyesters exhibit enhanced recovery from creasing when contrasted to those prepared from the Formula VII homopolymers.

Strong, flexible, films can be cast from N,N-dimethylformamide solutions of the polyesters of this invention. The moisture regain of these films is remarkably low. The polyesters and copolyesters of this invention can be melt pressed into films at temperatures near their polymer melt temperatures (defined below).

The following non-limiting examples are illustrative of the practice of the preferred embodiment of this invention. In these examples, inherent viscosity ($\eta_{inh}$) has been determined in accordance with the following equation:

$$\eta_{inh} = \ln(\eta_{rel})/(C)$$

wherein ($\eta_{rel}$) represents the relative viscosity and (C) represents a concentration of 0.5 grams of the polymer in 100 ml. of solution. The relative viscosity ($\eta_{rel}$) is determined by dividing the flow time in a capillary viscometer of a dilute solution of the polymer by the flow time for the pure solvent. The dilute solutions used herein for determining ($\eta_{rel}$) are of the concentration expressed by (C) above; the flow times are determined at 30° C. and, unless otherwise specified, are measured in trifluoroacetic acid. As used herein, the "polymer melt temperature," abbreviated "PMT," is defined as that temperature at which a polymer sample becomes molten and leaves a trail when moved across a hot metal surface under moderate pressure. Filament tenacity, elongation, and modulus are coded as "T./E./Mi." and are in units of grams/denier (g.p.d.), percent, and grams/den., respectively. The terms work recovery and tensile recovery, coded as WR. and TR., respectively, are reported in percent and are used as defined in Beaman and Cramer, J. Poly. Sci., vol. 21, 228 (1956). The subscripts on WR. and TR. refer to the percent elongation (e.g., 3%, 5%).

EXAMPLE I

This example demonstrates the preparation of α-chloromethyl-α-hydroxymethylpropionic acid.

Into a 2 liter flask provided with stopcock at the bottom and equipped with a double Hershberg stirrer, condenser, and thermometer is placed a solution of 180 g. of 3,3'-dichloropivalic acid in 500 ml. of ethylene chloride. After the ethylene chloride solution is cooled to about 0° C., a solution of 40 g. of sodium hydroxide in 500 ml. of water is slowly added while maintaining the temperature of the flask within the range of about 0°–5° C. When the caustic addition is completed, the mixture is stirred vigorously and is heated to 50° C. and maintained thereat for 30 minutes. Stirring is halted and the layers are allowed to separate. The ethylene chloride lower layer is drained off and dried over magnesium sulfate. An additional 500 ml. of ethylene chloride is added to the aqueous layer remaining in the flask and the mixture is stirred at 50° C. for 1 hr. The second ethylene chloride layer is separated and dried over magnesium sulfate. The dried and filtered ethylene chloride layers are combined and flash-distilled to remove the ethylene chloride. The residual liquid, about 85 g., is crude α-chloromethyl-α-methyl-β-propiolactone. This crude β-lactone is purified by fractional distillation to yield 78.2 g. of product, B.P. 58° C./2 mm.

A solution comprising 27 g. of the β-lactone, above, 0.5 ml. of phosphoric acid, and 20 ml. of water is heated at reflux for 8 hours. The solution is then neutralized with 0.3 g. of sodium acetate and 125 ml. of dry benzene are added to it. The contents of the flask are heated to remove the water as the benzene-water azetrope, B.P. 69.3° C./760 mm. The residual benzene solution is filtered and the filtrate is cooled to precipitate the desired product. There is obtained 21.5 g. of α-chloromethyl-α-hydroxymethylpropionic acid, M.P. 81°–84° C. A purified sample of this acid, recrystallized from ethylene chloride, has a melting point of 91°–92° C.

Analysis.—Calculated for $C_5H_9O_3Cl$: C, 39.36; H, 5.95; O, 31.46%. Found: C, 39.2; H, 5.8; O, 31.6%.

EXAMPLE II

This example illustrates the preparation of α-methyl-α-(2-tetrahydropyranyloxy)methyl-β-chloropropionic acid.

To 23.4 g. (0.28 mole) of dihydropyran is added a solution of 38 g. (0.25 mole) of α-chloromethyl-α-hydroxymethylpropionic acid in 25 ml. of ethylene glycol dimethyl ether and 0.5 ml. of 85% phosphoric acid. The ensuing exothermic reaction raises the temperature of the final solution to about 65° C.; the solution is then allowed to stand at about 40° C. for 2 days. The solution is taken up in 100 ml. of ether and washed 3 times with separate 50 ml. portions of 10% sodium acetate solution and a saturated sodium chloride solution. The washed ether layer is dried over sodium sulfate, filtered, and evaporated to dryness at high vacuum (final pressure is about 0.05 mm. of mercury). The residual product, a viscous liquid, is free of any dihydropyran. The product is α-methyl-α-(2-tetrahydropyranyloxy)methyl-β-chloropropionic acid, 54 g. (91.4% yield), whose structure is confirmed by infrared analysis.

EXAMPLE III

This example illustrates the preparation of α-methyl-α-(2-tetrahydropyranyloxy)methyl-β-propiolactone.

A solution of 95 g. (0.4 mole) of α-methyl-α-(2-tetrahydropyranyloxy)methyl-β-chloropropionic acid in 250 ml. of ethylene chloride is prepared. A 30.4 g. quantity of a 50% caustic solution is diluted with 300 ml. of water, cooled to 0° C., and added to the ethylene chloride solution with vigorous stirring. The pH of the resulting emulsion is adjusted to 6–7 and the emulsion is warmed to 55° C. and stirred for 1 hour. The layers are separated and the aqueous layer stirred for 1 hour with an additional 250 ml. of ethylene chloride. The ethylene chloride layers are combined, dried, and evaporated under high vacuum to yield 73.6 gram of a viscous liquid. The latter material is distilled under high vacuum and three fractions are collected: (A) B.P. 50°–55° C./0.05 mm.; (B) B.P. 83°–88° C./0.05–0.08 mm.; (C) B.P. 89°–93° C./0.08 mm.–0.17 mm.; a residue consisting of a heavy oil remains. Infrared and nuclear magnetic resonance data show that fraction C is pure α-methyl-α-(2-tetrahydropyranyloxy)methyl-β-propiolactone.

*Analysis.*—Calculated for $C_{10}H_{16}O_4$: C, 60.0; H, 8.0; O, 32.0%. Found: C, 59.9; H, 8.05; O, 31.7%.

EXAMPLE IV

This example illustrates the preparation of poly-(α-hydroxymethyl-α-methyl-β-propiolactone).

A solution of 10.0 g. of α-methyl-α-(2-tetrahydropyranyloxy)methyl-β-propiolactone in 40 ml. of n-hexane is heated to reflux and 0.06 ml. of 1 N tetrabutylammonium hydroxide is added. Precipitation of polymer begins almost immediately, but the reaction is permitted to run for a total 6 hours at reflux with continuous stirring. The hexane layer is decanted and the rather gummy polymer remaining is placed in 50 ml. of methanol to which 10 drops of concentrated hydrochloric acid are added. After about 5 minutes, the original polymer is completely dissolved and the solution quickly becomes opalescent. Precipitation begins when the solution is warmed on the steam bath. To this warm solution is added 5 ml. of saturated potassium bicarbonate solution followed by 150 ml. of water. The mixture is warmed for an additional 5 minutes on a steam bath, with stirring, after which it is filtered and washed with water (2 × 25 ml.) and acetone (2 × 50 ml.). The washed precipitate is dried overnight in a vacuum oven. The poly(α-hydroxymethyl-α-methyl-β-propiolactone) thus obtained weighs about 4 g., PMT=190° C. (dec. 280° C.), $\eta_{inh}$=0.4 (in N,N-dimethylformamide). Tough, colorless films are cast from a N,N-dimethylformamide solution of this polymer containing approximately 10% solids. These films show a moisture regain of only 2.4% when stored for 2 weeks at 70° F. and 75% relative humidity. From a similar polymerization (run only 3 hrs.) and subsequent workup, there is obtained a sample of this polymer ($\eta_{inh}$=0.17) which gives a clear melt at 195° C.

EXAMPLE V

This example illustrates the preparation of a copolymer from pivalolactone and α-methyl-α-(2-tetrahydropyranyloxy)-methyl-β-propiolactone, and of a fiber therefrom. Removal of the tetrahydropyranyl ether group from this fiber provides a fiber from a copolymer of pivalolactone and α-hydroxymethyl-α-methyl-β-propiolactone.

A reaction mixture comprising 22.5 g. of pivalolactone, 2.5 g. of α - methyl-α-(2 - tetrahydropyranyloxy) methyl - β - propriolactone, and 0.15 ml. of tetrabutylammonium hydroxide in 100 ml. of n-hexane is heated at reflux for 4 hours. The hexane is decanted and the copolymer is worked up as described in the Example IV to yield 23.2 g. of poly[α,α - dimethyl-β-propiolactone/α - hydroxymethyl - α - methyl-β-propiolatcone] (95/5) (93% yield), $\eta_{inh}$=1.14. A sample of this copolymer is melt spun at 225° C. at a pressure of 50 lbs. per square inch through a 0.012 mm. diameter spinneret hole. The extruded filament is quenched with ice water and wound up at the rate of 300 yards per minute; it is subsequently drawn 1.4× at 130° C. The tetrahydropyranyloxymethyl ether groups on the polymer chain are converted to hydroxymethyl groups by immersing the drawn filaments for one hour in methanol containing 0.1% hydrochloric acid. The filaments thus obtained are heat set a 170° C. for 1 hour. X-ray data obtained from these poly[α,α - dimethyl - β - propiolactone/α-hydroxymethyl - α - methyl - β - propiolactone] (95/5) filaments indicate that the copolymer is in the α-form and has an orientation of 19° and has high crystallinity. The copolymer filaments exhibit the following physical properties: T./E./Mi.=2.9/87/18; $WR._3/TR._3$=76/91; Work to break=1.35 g.p.d.

EXAMPLE VI

This example illustrates the enhanced degrees of dyeability and dye retention exhibited by the poly[α,α-dimethyl - β - propiolactone/α - hydroxymethyl-α-methyl-β- propiolactone] fibers prepared by the process of Example V, above, when such properties are contrasted with those of control fibers prepared from polypivalolactone.

The dyeing of samples of Example V fibers and of the control fibers is performed with the fiber-reactive dyes identified by Colour Index codes C.I. Reactive Red 10, C.I. Reactive Yellow 5, C.I. Reactive Orange 3 and C.I. Reactive Blue 6. The dyeings of 0.5 g. fiber samples are each carried out in a bath made up of 25 ml. water, 0.05 g. dye, and 0.01 g. Duponol "ME." The fiber samples, including control fibers of poly(pivalolactone), are entered cold and the tubes containing the individual dyeings are then heated in a boiling water bath. After 15 minutes, 0.2 ml. pyridine is added to each dye bath; heating is then continued for 1 hr. The dyeings are cooled, washed in water, and dried. The C.I. Reactive Yellow 5 dyes both fibers equally well, but with each of the other dyes, the Example V fibers dye much more deeply than the controls. The samples are scoured 3 times in 1% "Duponol ME" on the water bath for 30 min. This treatment removes virtually all color from the control fibers, but little from the Example V fibers. In other tests, it is shown that three treatments with perchloroethylene at 50° C. also removes virtually all color from the control dyeings but little from the Example V fibers.

EXAMPLE VII

This example illustrates the preparation of α-chloromethyl - α - (1-methoxy-1-methylethoxy)methylpropionic acid.

α - chloromethyl - α - hydroxymethylpropionic acid (152.5 g., 1 mole) is dissolved in 300 ml. of anhydrous ether in a one l. flask equipped with stirrer, drying tube and dropping funnel. Methyl isopropenyl ether (100 g., 1.38 mole) is added at such a rate as to keep the reaction temperature at 35°–40° C. This requires about 1 hr. At the end of this period, the solvent is removed from the clear colorless solution by vacuum evaporation on a rotary evaporator, after which 100 ml. hexane is added to the residue. The resultant solution crystallizes overnight. It is diluted with about 500 ml. additional hexane, filtered under nitrogen, and the isolated solid is dried in a vacuum oven at 50° C. There is thereby obtained α-chloromethyl - α - (1-methoxy-1-methylethoxy)methylpropionic acid, 198 g., M.P. 102.5°–104.5° C., whose structure is confirmed by infrared and nuclear magnetic resonance spectral analyses.

EXAMPLE VIII

This example demonstrates the synthesis of α-(1-methoxy - 1-methylethoxy)methyl - α - methyl-β-propiolactone.

α - chloromethyl - α - (1-methoxy-1-methylethoxy) methylpropionic acid (22.45 g., 0.1 mole) is dissolved in 50 ml. of 1,1,2-trichloroethane. This is cooled to 0° C. and stirred vigorously while the mixture is made just basic with about 8 g. of 50% sodium hydroxide solution in 50 ml. of water (previously cooled to 0° C.). The resulting mixture is quickly (about 4 min.) heated to 50° C. at which temperature it is maintained for 15 min. The mixture is then quenched in ice and the bottom layer separated, dried briefly over anhydrous magnesium sulfate, filtered, and the filtrate evaporated in a rotary evaporator at 12 mm. and 50° C. to yield 6 g. of crude α - (1 - methoxy-1-methylethoxy)methyl - α-methyl-β-propiolactone. The crude lactone is purified by recrystallization from hexane or, preferably, by vacuum sublimation at 40°–50° C. followed by recrystallization from hexane to yield a purified product, M.P. 52.5°–53° C. The infrared spectrum of this product shows a very strong β-lactone carbonyl absorption band at 5.48η, together with other strong absorption bands at 8.23, 9.1, 9.25, and 10.95η. The nuclear magnetic resonance spectrum of this lactone, consistent with the proposed structure, further confirms its structure.

*Analysis.*—Calculated for $C_9H_{16}O_4$: C, 57.43; H, 8.57%. Found: C, 57.4; H, 8.4%.

Alternatively, this β-lactone may be formed by first synthesizing the α - chloromethyl-α - (1 - methoxy-1-methylethoxy)methylpropionic acid in situ. In this method of operation, α - chloromethyl - α - hydroxymethylpropionic acid (15.25 g., 0.1 mole) is added to 100 ml. of 1,1,3-trichloroethane in a reaction flask to which is added 7.9 g. of methyl isopropenyl ether. To ensure complete reaction, this solution is kept at 50° C. for 1 hr. before being cooled to 0° C. and neutralized, as above, with about 8 g. of 50% caustic solution in 50 ml. $H_2O$. The resulting mixture is heated to 72° C. in about 3 min., at which temperature it is maintained for 4 minutes. Quenching of the mixture, separation, drying and evaporation of the lower layer as above yields 12.4 of the crude lactone.

Other experiments have shown that the yield of this β-lactone is improved by syntheses performed for shorter times at higher temperatures as contrasted to longer times at lower temperatures. In any case, it is extremely important that the reaction system not be allowed to become acidic through hydrolysis of the β-lactone, since this allows loss of the desired product through extremely rapid hydrolysis to the water-soluble α-hydroxymethyl-α-methyl-β-propiolactone. It is important that this monomer be freshly resublimed before use. On extended storage at room temperature it disproportionates to yield small quantities of the acetone acetal of α-hydroxymethyl-α-methyl-β-propiolactone. This contaminant leads to production of crosslinked polymers.

EXAMPLE IX

This example illustrates the preparation of a block copolyester from α-(1-methoxy-1-methylethoxy)methyl-α-methyl-β-propiolactone and pivalolactone and the melt spinning of a fiber thereof.

Freshly resublimed α-(1 - methoxy-1-methylethoxy) methyl-α-methyl-β-propiolactone (6.45 g., 0.343 mole) is dissolved in 25 ml. of ethyl acetate and 0.01 ml. 1 N tetrabutyl ammonium hydroxide is added. This solution is first stirred 30 min. at 70°, after which pivalolactone (21.5 g., 0.215 mole) is added. After a few minutes, stirring becomes difficult and an additional 50 ml. of ethyl acetate is added. The polymerization is continued for 4 hours. The block copolymer is isolated by filtration and drying. The product, ηinh=1.26, gives a melt from which cold drawable fibers can be pulled at 226° C. This copolymer is spun on larger scale at 228°–236° C. through a 0.012 mm. spinneret hole at 300 y.p.m. The fiber is quenched in ice water, drawn 4× at 165° C., and heat set for 18 hrs. at 175° C. It then shows the following tensile properties: T./E./Mi./TR.₃/WR.₅=2.7/67/28/94/82; work to break is 1.0 g./den.

EXAMPLE X

This example demonstrates the preparation of copoly-(α - hydroxymethyl - α - methyl-β-propiolactone/α,α-dimethyl-β-propiolactone) (20/80, mole basis) by the process of this invention.

A solution of once-distilled α-methyl-α-(2-tetrahydropyranyloxy)methyl-β-propiolactone (20 g., 0.1 mole) in 25 ml. of ethyl acetate is stirred with 10 g. of alkaline alumina (Woelm, activity grade 1) at 80° C. for 2 hrs. This mixture is then filtered, and the residual alumina is washed with ethyl acetate to a total volume of 100 ml. of filtrate and washings. To 20 ml. of the latter solution combined with 8 g. (0.08 mole) of pivalolactone are added 2.0 ml. of 0.02 N tetrabutyl ammonium hydroxide. The combined ingredients are then heated at about 78° C. for 4 hrs., after which the reaction mixture is diluted with ethyl acetate to form a free flowing slurry which is filtered. The residual precipitate of copoly[α-methyl-α-( 2- tetrahydropyranyloxy)methyl-β-propiolactone/α,α-dimethyl-β-propiolactone], after being dried, exhibits a PMT. of 160° C. This copolyester is subsequently treated with 100 ml. of 1% methanolic hydrogen chloride for 20 min. at 65° C. to produce copoly(α-hydroxymethyl-α - methyl-β-propiolactone/α,α-dimethyl-β-propiolactone) (20/80, mole basis), PMT.=195° C.

EXAMPLE XI

This example illustrates the preparation of filaments and yarn from a mixture of copolyesters prepared from α-hydroxymethyl-α-methyl-β-propiolactone and pivalolactone.

A mixture of 9.35 g. of a copolymer containing 15.5 mole percent α-hydroxymethyl-α-methyl-β-propiolactone and 84.5 mole percent pivalolactone and 5.9 g. of a copolymer containing 20 mole percent α-hydroxymethyl-α-methyl-β-propiolactone and 80 mole percent pivalolactone, both copolymers prepared as above, is pressed to a plug at about 190° C. and spun at 225° C. through a 0.012 mm. hole spinneret. The filament is quenched with ice water and wound up at 300 y.p.m. The filament is plied five times, and drawn 1.7× at 145° C. to yield yarn which is heat set for 20 hrs. at 170° C. The finished yarn, ηinh=1.44, exhibits the following tensile properties: T./E./Mi./WR.₃/TR.₃:1.7/107/20/80/92.

In another test it is found that this yarn, when creased by looping over another similar yarn and holding under 0.05 g.p.d. tension at 80° C. for 1 hr., shows a crease angle of 90° after standing 30 min. at 70° F. and 75% r.h. The crease angle recovers to 150° after steaming ½ hr. A similar sample of poly(pivalolactone) homopolymer yarn shows an original crease angle of 75° and a recovered angle of 130°.

What is claimed is:
1. α-Chloromethyl-α-hydroxymethylpropionic acid.
2. An acetal of the formula

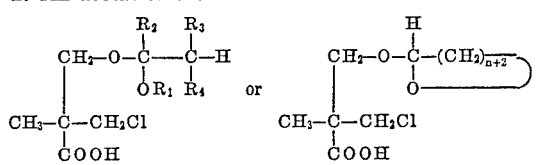

wherein $R_1$ represents a lower alkyl radical; $R_2$ represents a hydrogen atom or a lower alkyl radical; $R_3$ and $R_4$ represent members of the class consisting of a hydrogen atom, a lower alkyl radical or a phenyl radical; and $n$ is 1, 2, or 3.

3. A lactone of the formula

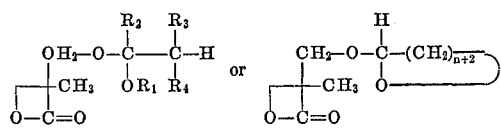

wherein $R_1$ represents a lower alkyl radical; $R_2$ represents a hydrogen atom or a lower alkyl radical; $R_3$ and $R_4$ represent members of the class consisting of a hydrogen atom, a lower alkyl radical or a phenyl radical; and $n$ is 1, 2, or 3.

4. Poly($\alpha$ - hydroxymethyl-$\alpha$-methyl-$\beta$-propiolactone) having an inherent viscosity of at least 0.15 when measured as a 0.5% solution in trifluoroacetic acid at 30° C.

5. A copolyester consisting essentially of at least about 75% of recurring structural units of the formula

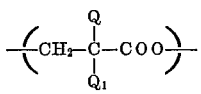

wherein Q and $Q_1$ are alkyl radicals containing from 1 to 4 carbon atoms which may be joined by carbon-to-carbon bonds to form an alicyclic ring, the remaining structural units being of the formula

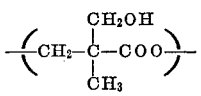

said polymer having an inherent viscosity of at least 0.3 when measured as a 0.5% solution in trifluoroacetic acid at 30° C.

6. Polymer consisting essentially of recurring structural units of the following formula

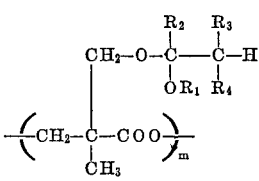

wherein $R_1$ represents a lower alkyl radical, $R_2$ represents a hydrogen atom or a lower alkyl radical, $R_3$ and $R_4$ represent members of the class consisting of a hydrogen atom, a lower alkyl radical, or a phenyl radical, and $m$ represents a number sufficiently large to provide a polymer having an inherent viscosity of at least 0.15 when measured as a 0.5% solution in trifluoroacetic acid at 30° C.

7. A polymer consisting essentially of recurring structural units of the following formula

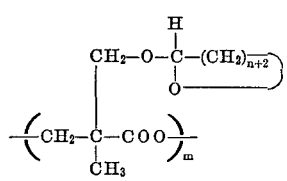

wherein $n$ is 1, 2, or 3, $m$ represents a number sufficiently large to provide a polymer having an inherent viscosity of at least 0.15 when measured as a 0.5% solution in trifluoroacetic acid at 30° C.

8. A copolyester consisting essentially of at least about 75% of recurring structural units of the formula

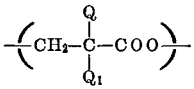

wherein Q and $Q_1$ are alkyl radicals containing from 1 to 4 carbon atoms which may be joined by carbon-to-carbon bonds to form an alicyclic ring, the remaining structural units being of the formula

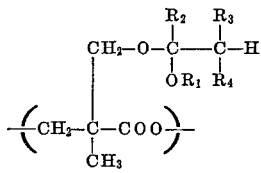

wherein $R_1$ represents a lower alkyl radical, $R_2$ represents a hydrogen atom or a lower alkyl radical, $R_3$ and $R_4$ represent members of the class consisting of a hydrogen atom, a lower alkyl radical, or a phenyl radical, said polymer having an inherent viscosity of at least 0.3 when measured as a 0.5% solution in trifluoroacetic acid at 30° C.

9. A copolyester consisting essentially of at least about 75% of recurring structural units of the formula

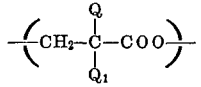

wherein Q and $Q_1$ are alkyl radicals containing from 1 to 4 carbon atoms which may be joined by carbon-to-carbon bonds to form an alicyclic ring, the remaining structural units being of the formula

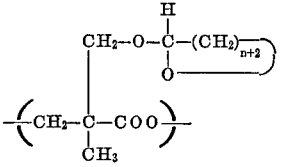

wherein $n$ is 1, 2, or 3, said polymer having an inherent viscosity of at least 0.3 when measured as a 0.5% solution in trifluoroacetic acid.

10. A fiber of the polymer of claim 5.
11. A fiber of the polymer of claim 8.
12. A fiber of the polymer of claim 9.

References Cited

UNITED STATES PATENTS

| | | | |
|---|---|---|---|
| 2,977,373 | 3/1961 | Reynolds et al. | 260—343.9 |
| 3,291,810 | 12/1966 | Lorenz | 260—343.9 |
| 3,300,451 | 1/1967 | Jackson et al. | 260—78.3 |
| 3,345,343 | 10/1967 | Tietz | 260—78.3 |

OTHER REFERENCES

"Chemistry of Carbon Compounds," E. H. Rodd, p. 482, vol. I, part A., 1st ed., 1951, Elsevier Publishing.

WILLIAM H. SHORT, Primary Examiner

E. NIELSEN, Assistant Examiner

U.S. Cl. X.R.

260—343.9, 345.7, 347.3, 535